(12) United States Patent
Grant et al.

(10) Patent No.: US 7,773,557 B2
(45) Date of Patent: Aug. 10, 2010

(54) DOWNLINK SIGNALING OF TRANSMITTER CONFIGURATION FOR CQI ESTIMATION

(75) Inventors: Stephen J. Grant, Cary, NC (US); Gregory E. Bottomley, Cary, NC (US); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 584 days.

(21) Appl. No.: 11/538,568

(22) Filed: Oct. 4, 2006

(65) Prior Publication Data

US 2007/0286124 A1 Dec. 13, 2007

Related U.S. Application Data

(63) Continuation-in-part of application No. 11/449,258, filed on Jun. 8, 2006.

(60) Provisional application No. 60/828,090, filed on Oct. 4, 2006.

(51) Int. Cl.
*H04W 4/00* (2009.01)
*H04B 7/00* (2006.01)

(52) U.S. Cl. ...................... 370/328; 370/310

(58) Field of Classification Search .............. 370/328, 370/310
See application file for complete search history.

(56) References Cited

U.S. PATENT DOCUMENTS

2002/0102950 A1 8/2002 Gore et al.
2003/0148770 A1* 8/2003 Das et al. ................. 455/455
2004/0063468 A1* 4/2004 Frank ...................... 455/561
2005/0181739 A1 8/2005 Krasny et al.
2006/0079221 A1 4/2006 Grant et al.
2006/0105761 A1* 5/2006 Walton et al. ............. 455/423
2006/0251156 A1 11/2006 Grant et al.

FOREIGN PATENT DOCUMENTS

WO 2004/040827 A2 5/2004
WO 2006/004500 1/2006

OTHER PUBLICATIONS

3rd Generation Partnership Project, Technical Specification Group Radio Access Network, Multiple-Input Multiple Output in UTRA, Technical Report, Oct. 2005, Chapter 5, available at: http://www.3gpp.org/ftp/Specs/html-info/25876.htm.

* cited by examiner

*Primary Examiner*—Vincent P Harper
*Assistant Examiner*—Timothy Pham
(74) *Attorney, Agent, or Firm*—Coats & Bennett, P.L.L.C.

(57) ABSTRACT

In a mobile communication system with a shared downlink traffic channel, the mobile terminals in contention for the downlink traffic channel report channel conditions to the base stations. The base station schedules the mobile terminals based on channel quality estimates from the mobile terminals and selects a transmitter configuration. The transmitter configuration may comprise, for example, the antenna configuration, and/or power and code allocations used by the base station. The base station broadcasts the transmitter configuration to all active and inactive mobile terminals. Knowledge of the transmitter configuration by the inactive mobile terminals improves the accuracy and reliability of the channel quality estimates.

47 Claims, 6 Drawing Sheets

DOWNLINK SIGNALING OF TRANSMITTER CONFIGURATION FOR CQI ESTIMATION

RELATED APPLICATIONS

This application is a continuation-in-part of U.S. patent application Ser. No. 11/449,258 filed Jun. 8, 2006, and claims priority to U.S. Patent Application Ser. No. 60/828,090 filed Oct. 4, 2006, which are incorporated herein in their entirety by reference.

BACKGROUND

The present invention relates generally to Code Division Multiple Access (CDMA) systems, and more particularly, to channel quality estimation for High Speed Downlink Packet Access (HSDPA) in Wideband CDMA (WCDMA) systems.

HSDPA is a wireless communication protocol for WCDMA systems specified by the Third Generation Partnership Project (3GPP). HSDPA provides a method for delivering packet data to a plurality of mobile terminals over a shared downlink channel called the High Speed Downlink Shared Channel (HS-DSCH). HS-DSCH is divided into successive timeslots or scheduling intervals, which are called Transmission Time Intervals (TTI) in the standard. During a given TTI, one or more mobile terminals may be scheduled to receive packet data from a base station on the HS-DSCH. The mobile terminals sharing the HS-DSCH estimate the channel conditions and report the channel quality estimates to the base station on an uplink channel called the High Speed Dedicated Physical Control Channel (HS-DPCCH). A scheduler at the base station uses the channel quality estimates provided by the mobile terminals to schedule transmissions to the mobile terminals. The channel quality estimates are also used to select a modulation and coding scheme for the scheduled mobile terminal.

In order to achieve higher data rates, it has been proposed to use multiple transmit antennas at the base station to transmit packet data to the mobile terminals, which may have one or more receive antennas. Such systems are referred to as multiple-input, single-output (MISO) and multiple-input, multiple-output (MIMO) systems. Multiple antenna systems exploit the spatial dimensions of the signal at the receiver to achieve higher spectral efficiency and higher data rates without increasing bandwidth. In multiple antenna systems, there is typically no one antenna configuration that performs consistently better than the others over the range of possible operating conditions envisioned for deployment. Therefore, antenna configuration selection may be employed to select the antenna configuration that is best suited for the currently-scheduled mobile terminal.

When antenna configuration selection is employed in a multiple antenna system, estimating channel conditions can be problematic for mobile terminals that are not currently-scheduled, i.e., the inactive mobile terminals. The inactive mobile terminals must estimate channel conditions as if they were currently-scheduled. However, the antenna configuration selected for the currently-active mobile terminal may not be the most desirable configuration for the inactive mobile terminal. Moreover, the inactive mobile terminals typically do not have knowledge of the antenna configuration being used. Such knowledge is necessary in order to remove the effects of the current antenna configuration from the calculation of channel quality estimates.

U.S. patent application Ser. No. 11/449,258 filed Jun. 8, 2006 describes a method of estimating channel quality in which the antenna configuration is first estimated by the inactive mobile terminals. The estimated antenna configuration is then used to remove the effects of the antenna configuration for the currently-scheduled mobile terminal from the channel quality estimates reported to the base station. The mobile terminals can then report channel quality assuming an antenna configuration that is best for them. While this technique is useful in some operating conditions, errors in channel quality estimation may nevertheless result.

Improvements in the reliability of channel quality estimates would result in greater spectral efficiency. Therefore, an improved method of channel quality estimation for multiple antenna systems is needed.

SUMMARY

The present invention provides an improved method for estimating the channel quality of a shared downlink channel. The shared downlink channel is divided into a plurality of scheduling intervals. During each scheduling interval, a transmitting station schedules one or more mobile terminals to receive data. The mobile terminals scheduled to receive data are referred to as active mobile terminals. A transmitter configuration is selected for transmitting data to the active mobile terminals. To improve channel quality estimation, the transmitting station broadcasts transmitter configuration information to one or more inactive mobile terminals. The transmitter configuration information enables the inactive mobile terminals to take the transmitter configuration into account in determining channel quality estimates.

The transmitter configuration may be transmitted to the inactive mobile terminals over a broadcast control channel. The transmitter configuration can be broadcast to all mobile terminals in contention for the shared downlink channel, or to a subset of the mobile terminals in contention for the shared downlink channel. The broadcast control channel may also be used to send additional information, such as power and code allocations.

In one exemplary embodiment, the transmitting station selects an antenna configuration for serving the active mobile terminals and transmits antenna configuration information to the mobile stations. The antenna configuration information may comprise, for example, an antenna selection vector indicating selected transmit antennas for serving the active mobile terminals. In another embodiment, the antenna configuration information may include a weight vector indicating the antenna weights for a transmit stream.

In another embodiment of the invention, the transmitter configuration information may comprise power allocation information and/or code allocation information indicating the power and/or code allocation used by the base station to serve the active mobile terminals. In one embodiment, the power allocation information may indicate the relative transmit power for different antennas or streams. In another embodiment, the power allocation information may comprise a relative power ratio between two downlink channels, such as a data-to-pilot ratio.

DETAILED DESCRIPTION

Figure 1:
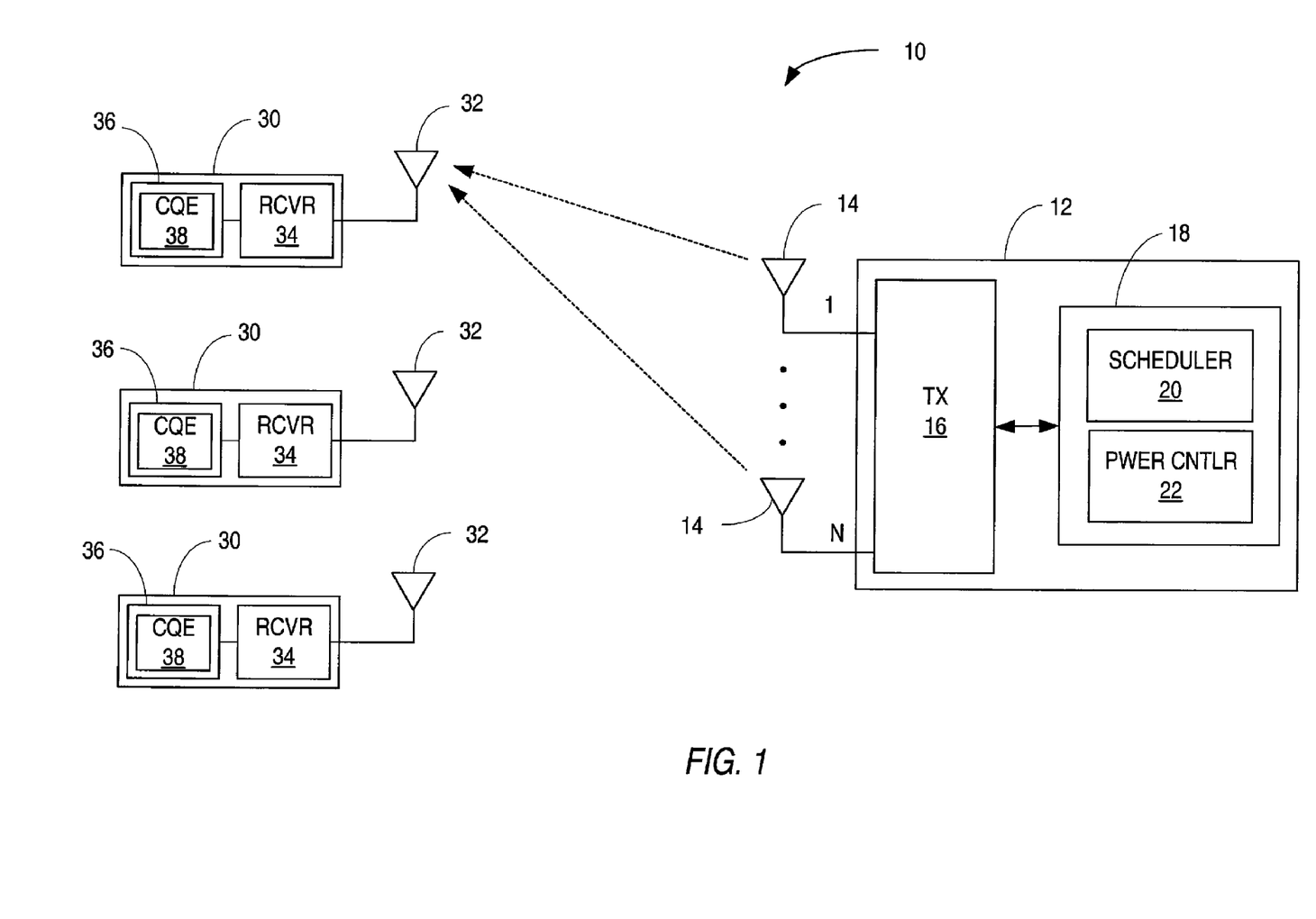
FIG. 1 illustrates an exemplary multiple antenna system for transmitting packet data to a plurality of mobile terminals.

FIG. 1 illustrates an exemplary multiple antenna communication system 10. As shown in FIG. 1, a base station 12 transmits packet data to a plurality of mobile terminals 30 over a shared downlink channel. The base station 12 comprises multiple transmit antennas 14, a multiple antenna transmitter 16, and a control unit 18. The control unit 18 includes a scheduler 20 to schedule transmissions to the mobile terminals 30 and a power controller 22 to perform power control for downlink control channels as will be hereinafter described. In the exemplary embodiment, each mobile terminal 30 has one or more receive antennas 32, a receiver 34, and a control unit 36. The control unit 36 includes a channel quality estimator 38 to estimate the channel conditions on the shared downlink channel and to report the channel conditions to the base station 12. The present invention can be applied, for example, to High Speed Downlink Packet Access (HSDPA) for a Wideband Code Division Multiple Access (WCDMA) network 10. Those skilled in the art will appreciate, however, that the present invention may be applied to other communication technologies, such as Orthogonal Frequency Division Multiple Access (OFDM) and time division multiple access (TDMA) systems.

HSDPA defines a shared downlink packet data channel called the High Speed Downlink Shared Channel (HS-DSCH). The HS-DSCH is divided in the time domain into a plurality of time intervals called Transmission Time Intervals (TTIs). A TTI is 2 msec in duration and is the basic unit of time used for scheduling transmissions to the mobile terminals 30. The TTI is divided into three 0.667 msec time slots. During any given TTI, the base station 12 allocates up to fifteen channelization codes for the HS-DSCH, which may be allocated to a single mobile terminal 30, or divided between two or more mobile terminals. The scheduler 20 at the base station 12 determines which mobile terminals 30 shall receive data in each TTI. The scheduled mobile terminals 30 for a given TTI are referred to herein as the active mobile terminals 30. The mobile terminals 30 not scheduled to receive data during a given TTI are referred to as the inactive mobile terminals 30.

The mobile terminals 30 in contention for the HS-DSCH (including both active and inactive mobile terminals 30) estimate the channel conditions during each TTI and report channel quality estimates to the base station 12 on an uplink channel called the High Speed Dedicated Physical Control Channel (HS-DPCCH). In WCDMA systems, the channel quality estimates comprise one or more Channel Quality Indicators (CQIs). The scheduler 20 determines which mobile terminals 30 to serve in each TTI based on the CQI reports from each mobile terminal 30, the amount of data pending in its buffer for each mobile terminal 30, and other factors such as the average throughput to each mobile terminal 30 and any Quality of Service (QoS) guarantees. The scheduler 20 also determines the transmission format (i.e., modulation and coding scheme) based on the CQIs for the active mobile terminals 30.

The base station 12 indicates the active mobile terminals 30 for a given TTI, the code allocations, and the transmission format on a shared control channel called the High Speed Shared Control Channel (HS-SCCH). The base station 12 transmits the HS-SCCH two timeslots before the start of the corresponding TTI. The mobile terminals 30 in contention for the HS-DSCH monitor the HS-SCCH to determine when they are being scheduled.

In the system described above, the mobile terminals 30 may determine a desired antenna configuration based on estimates of the channel conditions between the mobile terminal 30 and the base station 12. A requested antenna configuration may be sent to the base station 12 along with the CQI report over the HS-DPCCH. When a mobile terminal 30 is scheduled, the base station 12 chooses the antenna configuration, which may differ from the one requested by the scheduled mobile terminal 30. Conventionally, the base station 12 indicates the selected antenna configuration to only the active mobile terminals 30 via the HS-SCCH, which need to know the selected antenna configuration on order to receive the transmitted data.

While multiple antenna systems increase the channel capacity, the antenna configuration selection process adds to the difficulty of determining the CQI of the downlink channel, particularly for the inactive mobile terminals 30. The antenna configuration influences CQI estimation by the mobile terminal 30. The active mobile terminals 30 will have knowledge of the antenna configuration from the HS-SCCH. Therefore, the active mobile terminals 30 can despread the traffic channel and compute the CQI estimates for the traffic channel taking into account the current antenna configuration. The inactive mobile terminals 30, in contrast, must estimate CQI as if they were the active mobile terminal 30. The inactive mobile terminals 30 may estimate CQI assuming some nominal power and code allocation. The base station 12 can subsequently adjust the nominal CQI estimates from the inactive mobile terminals 30 based on the actual code and power allocations at the time of scheduling. The adjusted CQIs may then be used to make scheduling decisions. Once the scheduling decision is made, the base station 12 can select the MCS based on the adjusted CQI. However, the inactive mobile terminals 30 have no knowledge of the current antenna configuration when estimating CQI, which makes their estimates of the CQI less reliable.

According to the present invention, a mechanism is provided to enable the base station 12 to explicitly signal the selected antenna configuration for each TTI to the inactive mobile terminals 30. In one embodiment, the base station 12 broadcasts the selected antenna configuration in each TTI on a downlink broadcast control channel to all active and inactive mobile terminals 30. The base station 12 could, alternatively, broadcast the selected antenna configuration to a selected group of active and inactive mobile terminals 30 that are most likely to be scheduled. The users most likely to be scheduled may be determined based on the reported channel conditions and/or the amount of data queued at the base station 12. Thus, the inactive mobile terminals 30 can take the selected antenna configuration into account in determining the CQI of the shared downlink channel, which should result in more reliable CQI estimates. More reliable CQI estimates, in turn, should result in an increase in channel throughput on the shared downlink channel.

Figure 2:
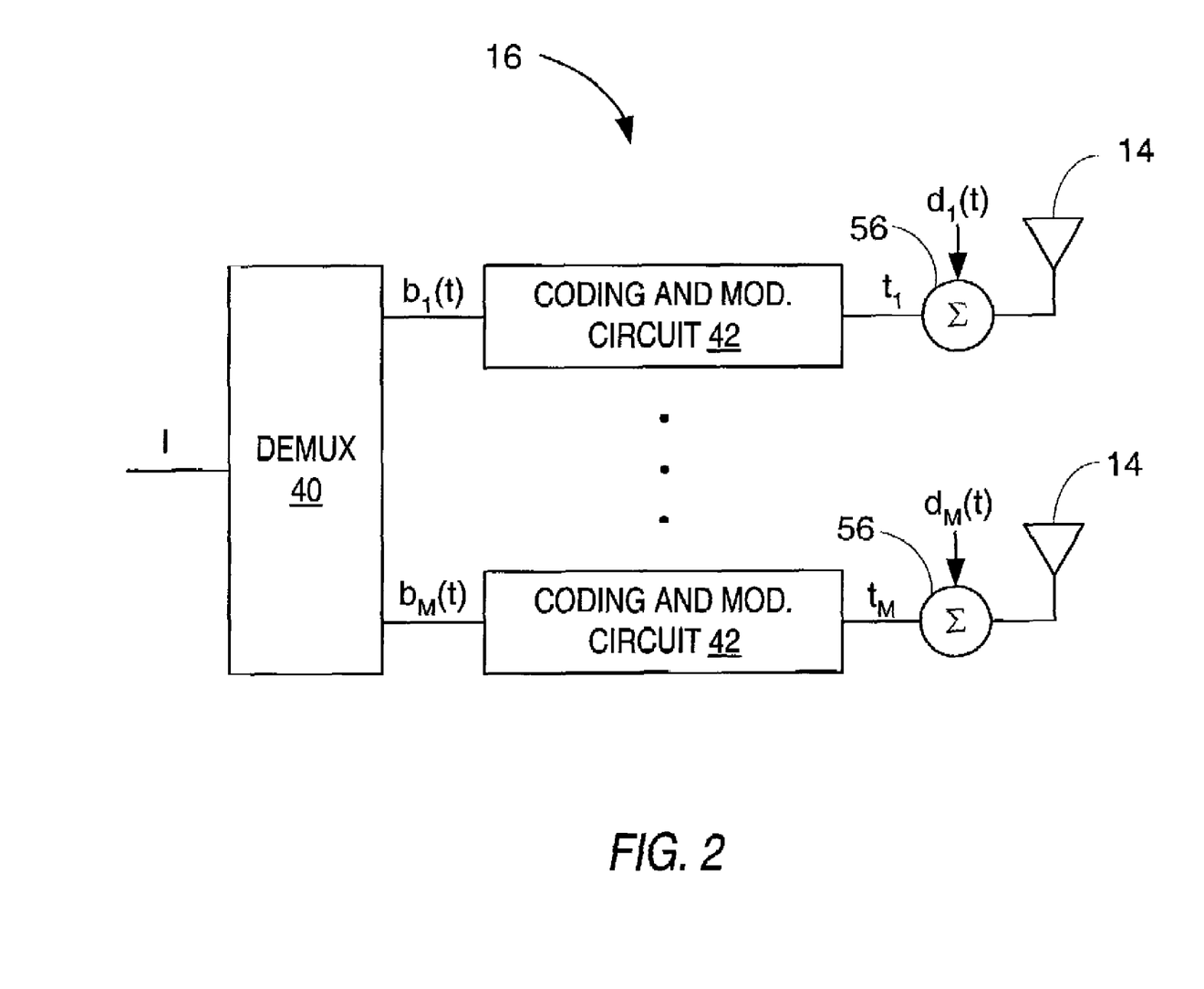
FIG. 2 illustrates a first exemplary transmitter for the multiple antenna system.

FIG. 2 illustrates an exemplary transmitter 16 for the base station 12 according to a first embodiment. A demultiplexer 40 divides the original information bit stream I into M bit streams $b_x(t)$, which are input to respective coding and modulation circuits 42. There is a one-to-one correspondence between the coding and modulation circuits 42 and the transmit antennas 14. Each coding and modulation circuit 42 couples to a corresponding transmit antenna 14. The transmit signals output by the coding and modulation circuits 42 may be combined by combiner 56 prior to transmission with one or more other simultaneously transmitted signals $d_x(t)$ that contain a number of dedicated channels and control channels, as well as a common pilot channel.

Figure 3:
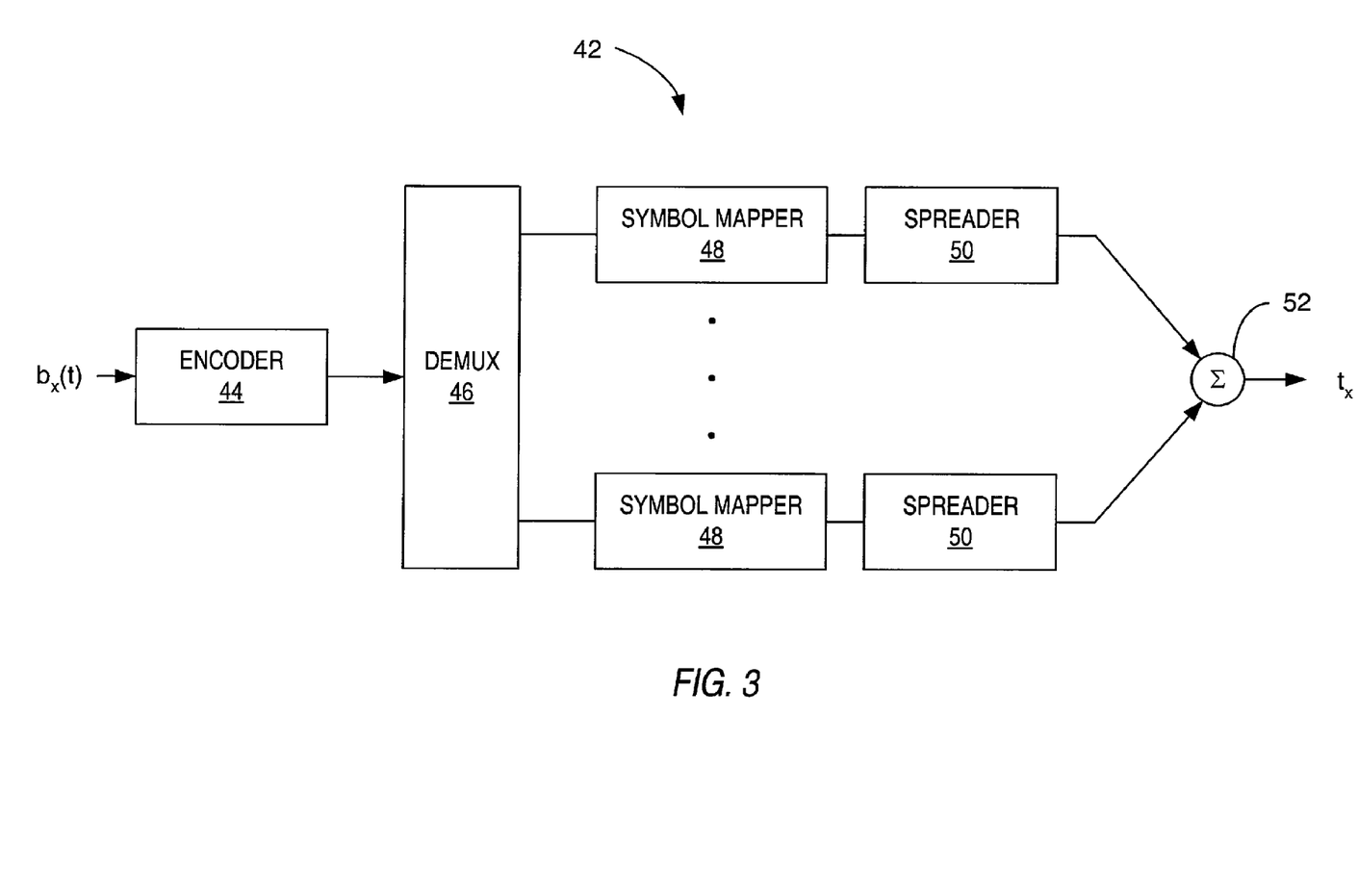
FIG. 3 illustrates an exemplary modulation and coding circuit for a transmitter.

FIG. 3 illustrates an exemplary coding and modulation circuit 42 employing per antenna rate control (PARC). PARC is a multiple stream transmitting technique used in wireless communication systems to increase system capacity. In this embodiment, each coding and modulation circuit 42 comprises an encoder 44 to encode the bit stream $b_x(t)$, a demultiplexer 46 to further divide the bit stream $b_x(t)$ into two or more substreams, a plurality of symbol mappers 48 to map each substream to a point on a signaling constellation, a plurality of signal spreaders 50 to apply a selected spreading code to each substream, and a combiner 52 to recombine the sub-streams to generate a transmit signal for transmission. Each bit stream $b_x(t)$ may be encoded at a different rate based on CQI feedback from the mobile terminal 30. Up to K spreading codes may be allocated to each bit stream. The K spreading codes may be reused for different antennas 14.

In the embodiment shown in FIGS. 2 and 3, the antenna configuration that can be adapted for the channel conditions comprises the number of transmit streams or antennas and the selected transmit antennas. The scheduler 20 at the base station 12 can represent the antenna configuration as a length M antenna selection vector, where M equals the number of transmit antennas 14. Each element of the antenna selection vector corresponds to one transmit antenna 14 and takes value of "1" if the antenna is selected or a value of "0" if the antenna is not selected. Thus, for base station 12 with two transmit antennas, the antenna selection vector a takes on the following values:

$a_1=[1,0]$, $a_2=[0,1]$ $a_3=[1,1]$

When $a=a_1$ or $a=a_2$, only one transmit antenna 14 is used. When $a=a_3$, both transmit antennas 14 are used.

The antenna selection vector a may be broadcast to all active or inactive mobile terminals 30 in contention for the HS-DSCH over a broadcast control channel. The broadcast control channel is described in further detail below. Alternatively, the antenna selection vector a may be transmitted to a selected group of mobile terminals 30 as hereinafter described. The signaling rate is once per TTI since the antenna configuration can change during every TTI.

Figure 4:
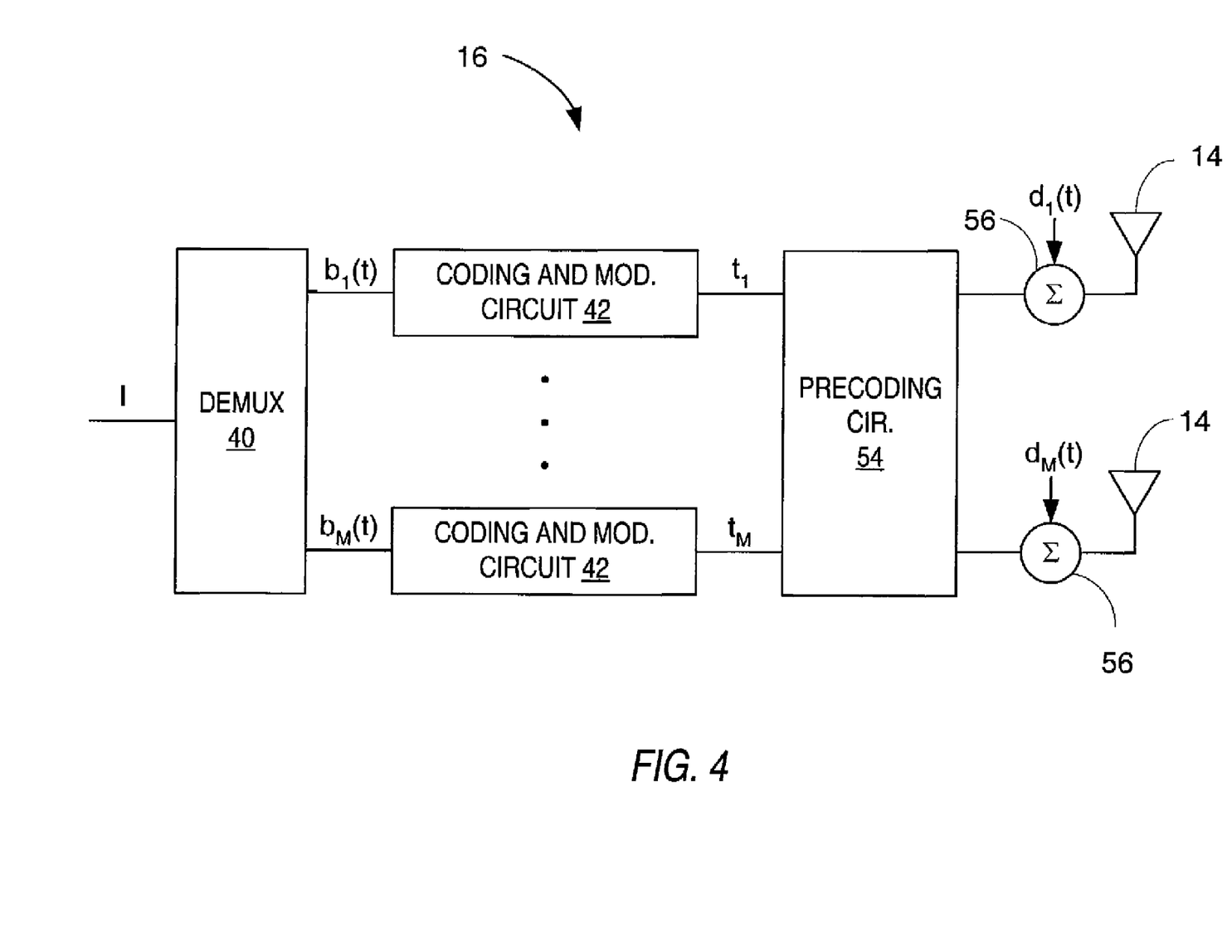
FIG. 4 illustrates a second exemplary transmitter for the multiple antenna system.

FIG. 4 illustrates an exemplary transmitter 16 for an alternate embodiment using a form of adaptive transmit diversity. The embodiment shown in FIG. 4 is similar to the previous embodiment and the same reference numbers are therefore used to indicate the elements that are the same. A demultiplexer 40 divides the original information bit stream I into M bit streams $b_x(t)$, which are input to respective coding and modulation circuits 42 as previously described. The modulation and coding circuits 42 shown in FIG. 3 may also be used in this embodiment. Unlike the previous embodiment, there is not a one-to-one correspondence between the coding and modulation circuits 42 and the transmit antennas 14. The transmit signals output by each coding and modulation circuit 42 are transmitted from all transit antennas 14 with different weights applied for each transmit antenna 14. The transmit signals output by the coding and modulation circuits 42 are input to a preceding circuit 54. The precoding circuit 54 uses a precoding matrix W to precode the transmit signals before transmission.

To understand how the precoding matrix W is used, consider a transmitter with two transmit antennas 14 configured for the Dual Stream Transmit Adaptive Antenna (D-TxAA) mode in WCDMA. In this case, the precoding matrix W may take on three possible values:

$W_1=[w_{11}\ 0]$, $W_1=[0\ w_{22}]$, $W_1=[w_{31}\ w_{32}]$

The length-two weight vectors $w_{11}$, $w_{22}$, $w_{31}$, and $w_{32}$ contain complex weights, which may be chosen from a codebook. For D-TXAA mode of WCDMA, the Closed Loop Mode 1 (CL-1) codebook may be used. The CL-1 codebook contains four possible weight vectors from which to choose. Other codebooks books could also be used on other embodiments for the invention. The selected weight vector may be chosen to maximize received power, SINR, or data rate. If $W=W_1$ or $W=W_2$, only one stream is transmitted. Unlike PARC, however, differently weighted symbols from the transmit stream are transmitted from each transmit antenna 14. If $W=W_3$, two transmit streams are transmitted with different weight vectors for each transmit stream. In this case, $w_{31}$ may be selected from the CL-1 codebook and $w_{32}$ may be selected to be orthogonal to $w_{31}$.

In the embodiment shown in FIG. 4, the antenna configuration comprises the number of transmit streams and the weight vector to be applied to each of the transmit streams, and possibly the antenna selection. Since the number of possible weight vectors equals four in the two antenna example described above, a particular weight vector can be indicated by transmitting an index value in the range of 0 to 3. The index may be represented using two bits. The mobile terminals 30 also need to know the number of streams transmitted. For the two antenna example, the number of streams can be signaled with a single bit. For example, a "0" may indicate 1 stream and a "1" may indicate two streams. If the transmit antenna 14 can be selected in the two antenna mode, a fourth bit is need to indicate which transmit antenna is selected. As in the previous embodiments, the antenna configuration information may be broadcast to all active and inactive mobile terminals 30 on a downlink broadcast control channel, or to a selected group of the mobile terminals 30.

To implement the present invention, a new High Speed Downlink Broadcast Control Channel (HS-DBCCH) is defined for broadcasting the antenna configuration information to the active and inactive mobile terminals 30. The HS-DBCCH is similar to the HS-SCCH defined in the current standard. However, unlike the HS-SCCH, the HS-DBCCH can address a group of mobile terminals 30 using a group identifier. The group identifier may be applied, for example, as a mask to the HS-DBCCH. The antenna configuration may be broadcast to a selected group of the mobile terminals 30, referred to herein as the broadcast group, that are most likely to be scheduled. For example, the base station 12 may include a select number of mobile terminals 30 with the strongest signal in the broadcast group. Alternatively, the mobile terminals 30 may be included within the broadcast group based on the amount of data stored in a transmit buffer at the base station 12. The group membership and/or group identifier can be transmitted to the mobile terminals 30 using higher layer signaling at a relatively low rate. In this manner, group membership can be changed dynamically.

One or more group identifiers may be used to divide the mobile terminals 30 into different groups. For example, one group may comprise mobile terminals 30 that the scheduler expects to serve with a single transmit stream. A second group may comprise mobile terminals 30 that the scheduler expects to serve with two or more transmit streams. Thus, different information can be transmitted to different groups.

The HS-DBCCH should be power controlled to ensure that the mobile terminals 30 within the broadcast group can decode the HS-DBCCH. Group power control as described in U.S. patent application Ser. No. 11/167,370 can be used. This application is incorporated herein by reference. With group power control, each mobile terminal 30 in the broadcast group sends an indication to the base station 12 asking for more or less power. If all of the mobile terminals 30 indicate that less power is needed, the base station 12 lowers the transmit power. However, if at least one mobile terminal 30 indicates that it needs more power, the base station 12 increases the transmit power on the HS-DBCCH.

In the embodiment shown in FIGS. 2 and 3, the antenna selection vector a is broadcast on the HS-DBCCH. In the embodiment shown in FIG. 4, an index corresponding to the weight vector w for each transmit stream is broadcast on the HS-DBCCH along with the number of transmit streams and the antenna selection, if applicable. Alternatively, an index to the weight matrix W may be transmitted in the embodiment shown in FIG. 4. The antenna configuration may be broadcast to all mobile terminals 30 in contention of the HS-DSCH or to a selected group thereof as described above.

The HS-DBCCH can be used to broadcast transmitter configuration information in addition to or in place of antenna configuration information. For example, the HS-DBCCH could also be used to transmit current power and code allocations, which would allow the mobile terminals 30 to prepare CQI estimates based on actual resources in use rather than a nominal resource allocation. For example, the power allocation per mobile terminal 30 or per transmit antenna 14 could also be transmitted. The power allocation per antenna could be signaled using a power allocation vector p that contains absolute values or relative values. In the case of four transmit antennas 14, for example, the power allocation vector could be given as fractional values. For example, the power allocation vector $p_1=[0, \frac{3}{4}, 0, \frac{1}{4}]$ indicates that two antennas are selected transmitting at 75% and 25% power, respectively. The power allocation per transmit stream for adaptive transmit diversity could be signaled in a similar manner.

In one exemplary embodiment, the base station 12 may use the HS-DBCCH to transmit a relative power allocation for different downlink channels to a select group of active and inactive mobile terminals 30. As previously described, the base station 12 may transmit one or more pilot signals, voice signals, and control signals in addition to the data signal on the HS-DSCH. It may be beneficial that the mobile terminals 30 know the relative power allocation for the different channels for CQI estimation. Thus, a power ratio can be transmitted on the HS-DBCCH to indicate a relative power allocation. For example, the base station 12 may transmit a data-to-pilot ratio that indicates the transit power of the HS-DSCH relative to the pilot channel. Similarly, the base station 12 could transmit a voice-to-pilot ratio, or common channels-to-pilot ratio that indicate the relative transmit powers of the voice channel and common channels to the pilot channel.

In MIMO systems, the code allocations may be transmitted to the mobile terminals 30 on the HS-DBCCH. Knowledge of the code allocation for the HS-DSCH would allow the mobile terminals 30 to estimate the CQI more accurately.

Figure 5:
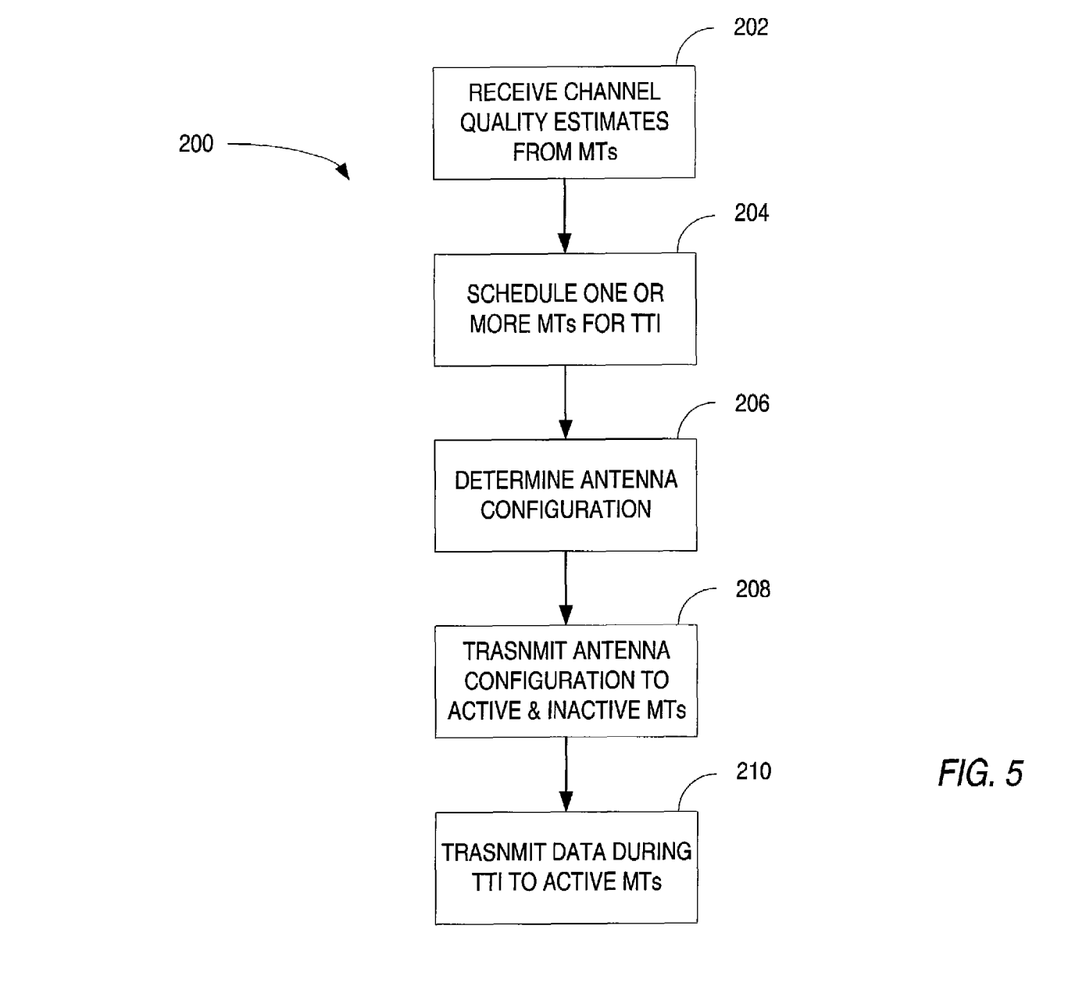
FIG. 5 illustrates an exemplary procedure implemented by a base station in the multiple antenna system.

FIG. 5 illustrates an exemplary procedure 200 performed by the base station 12 according to one exemplary embodiment. The scheduler 20 at the base station 12 receives channel quality estimates from each mobile terminal 30 contending for the channel during a given TTI (block 202). Based on the channel quality estimates and possibly other factors, the scheduler 20 schedules one or more mobile terminals 30 to receive data during a TTI (block 204) and selects an antenna configuration for transmitting packet data to the active mobile terminals (block 206). The antenna configuration is transmitted over a broadcast control channel to the active and inactive mobile terminals prior to the beginning of the TTI (block 208). During the TTI, the base station transmits packet data to the active mobile terminals using the selected antenna configuration (block 208). Both the inactive and active mobile terminals determine the CQI for the downlink channel and report the CQI to the base station (block 210).

Figure 6:
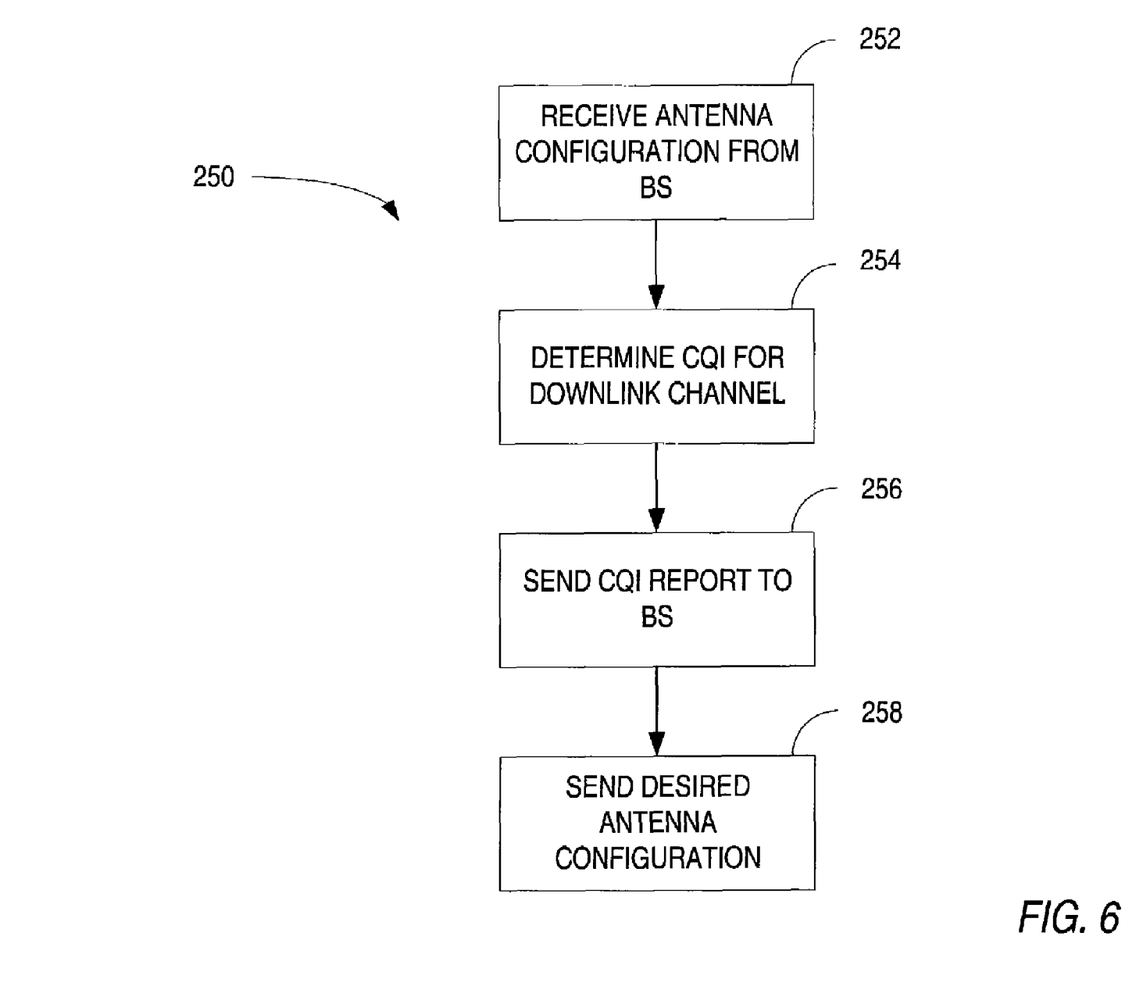
FIG. 6 illustrates an exemplary procedure implemented by a mobile terminal in the multiple antenna system.

FIG. 6 illustrates an exemplary procedure 250 performed by an inactive mobile terminal according to one exemplary embodiment. The inactive mobile terminal 30 receives a selected antenna configuration from the base station 12 (block 252). As previously noted, the selected antenna configuration is transmitted to active and inactive mobile terminals 30 on a broadcast control channel. During the corresponding TTI, the inactive mobile terminal 30 determines the CQI taking into account the antenna configuration employed at the base station (block 254) and sends a CQI report to the base station on the HS-DPCCH (block 256). U.S. patent application Ser. No. 11/449,258 filed Jun. 8, 2006, which is incorporated herein, describes one method for computing CQI estimates using estimates of the antenna configuration. The inactive mobile terminal 30 may also send a desired antenna configuration to the base station along with the CQI report (block 258).

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of transmitting packet data from base station to a plurality of mobile terminals over a shared packet data channel, said method comprising:
   receiving channel quality estimates from said plurality of mobile terminals;
   scheduling one or more active mobile terminals to receive packet data on said shared packet data channel based on said channel quality estimates from said plurality of mobile terminals;
   selecting an antenna configuration for transmitting packet data to the active mobile terminals;
   transmitting antenna configuration information for the selected antenna configuration to one or more inactive mobile terminals; and
   transmitting packet data to the active mobile terminals using the selected antenna configuration.

2. The method of claim 1 wherein transmitting antenna configuration information to the inactive mobile terminals comprises broadcasting the antenna configuration information to the inactive mobile terminals on a shared downlink control channel.

3. The method of claim 2 wherein the antenna configuration information is broadcast over the shared channel to both active and inactive mobile terminals.

4. The method of claim 2 wherein the antenna configuration information is broadcast to a selected group of inactive mobile terminals identified by a group identifier.

5. The method of claim 4 further comprising power controlling the shared downlink control channel by increasing the transmit power when any one of said mobile terminals requests an increase, and decreasing the transit power when all of said mobile terminals request a decrease.

6. The method of claim 1 wherein transmitting antenna configuration information to the inactive mobile terminals comprises transmitting an antenna selection vector indicating selected transmit antennas.

7. The method of claim 6 wherein transmitting antenna configuration information to the inactive mobile terminals further comprises transmitting power allocation information to said inactive mobile terminals.

8. The method of claim 7 wherein the power allocation information comprises a power allocation vector containing the power allocation per antenna for the selected transmit antennas.

9. The method of claim 6 wherein transmitting antenna configuration information to the inactive mobile terminals comprises transmitting a number of transmit streams and a corresponding weight vector for each transmit stream to said inactive mobile terminals.

10. The method of claim 9 further comprising transmitting power allocation information to said inactive mobile terminals.

11. The method of claim 10 wherein the power allocation information comprises a power allocation vector containing the power allocation per transmit stream.

12. A base station for transmitting packet data to a plurality of mobile terminals over a shared downlink channel, said base station comprising:
  a multiple antenna transmitter for transmitting data to one or more active mobile terminals over a shared downlink channel using a selected antenna configuration;
  a control unit including a scheduler for determining said active mobile terminals and said antenna configuration based on channel quality estimates from said plurality of mobile terminals; and
  wherein said control unit is configured to transmit antenna configuration information to one or more inactive mobile terminals.

13. The base station of claim 12 wherein the control unit transmits the antenna configuration information to the inactive mobile terminals on a shared downlink control channel.

14. The base station of claim 13 wherein the control unit broadcasts the antenna configuration information over the shared downlink control channel to both active and inactive mobile terminals.

15. The base station of claim 13 wherein the control unit broadcasts said antenna configuration information to a selected group of the inactive mobile terminals identified by a group identifier.

16. The base station of claim 15 wherein the control unit further comprises a power controller to power control the shared downlink control channel.

17. The base station of claim 16 wherein power controller increases the transmit power when any one of said mobile terminals requests an increase, and decreases the transit power when all of said mobile terminals request a decrease.

18. The base station of claim 12 wherein the control unit transmits antenna configuration information to the inactive mobile terminals by transmitting an antenna selection vector indicating selected transmit antennas.

19. The base station of claim 18 wherein the control unit further transmits power allocation information to the inactive mobile terminals.

20. The base station of claim 19 wherein the power allocation information comprises the power allocation per antenna for the selected transmit antennas.

21. The base station of claim 12 wherein the control unit transmits antenna configuration information to the inactive mobile terminals by transmitting the number of transmit streams and a corresponding weight vector for each transmit stream to the inactive mobile terminals.

22. The base station of claim 21 wherein the control unit further transmits power allocation information to said inactive mobile terminals.

23. The base station of claim 22 wherein the power allocation information comprises a power allocation vector containing the power allocation per transmit stream.

24. A method implemented by an inactive mobile terminal of determining channel quality for a shared downlink channel, said method comprising:
  receiving antenna configuration information from a transmitting station indicating a current antenna configuration used by said transmitting station to transmit data to an active mobile terminal;
  using said antenna configuration information to determine channel quality estimates for said inactive mobile terminal; and
  reporting said channel quality estimates to said transmitting station.

25. The method of claim 24 wherein the antenna configuration information is received on a broadcast control channel used to broadcast antenna configuration information to a plurality of inactive mobile terminals.

26. The method of claim 24 wherein receiving antenna configuration information comprises receiving an antenna selection vector from said transmitting station indicating selected transmit antennas.

27. The method of claim 26 wherein receiving antenna configuration information further comprises receiving power allocation information from said transmitting station.

28. The method of claim 27 wherein the power allocation information comprises a power allocation vector containing the power allocation per antenna for the selected transmit antennas.

29. The method of claim 26 wherein receiving antenna configuration information comprises receiving the number of transmit streams and a corresponding weight vector for each transmit stream from said transmitting station.

30. The method of claim 29 further comprising receiving power allocation information from said transmitting station.

31. The method of claim 30 wherein the power allocation information comprises a power allocation vector containing the power allocation per transmit stream.

32. An inactive mobile terminal sharing a downlink channel with an active mobile terminal, said inactive mobile terminal comprising:
  a receiver to receive antenna configuration information from a transmitting station indicating a current antenna configuration used by said transmitting station to transmit data to the active mobile terminal; and
  a control unit including a channel estimator configured to:
    determine channel quality estimates for the shared downlink channel in periods when the inactive mobile terminal is not scheduled using said antenna configuration information; and
    to send said channel quality estimates to said transmitting station.

33. The mobile terminal of claim 32 wherein the antenna configuration information is received on a broadcast control channel used to broadcast antenna configuration information to a plurality of inactive mobile terminals.

34. The mobile terminal of claim 32 wherein the antenna configuration information comprises an antenna selection vector indicating selected transmit antennas.

35. The mobile terminal of claim 33 wherein the antenna configuration information further comprises power allocation information from said transmitting station.

36. The mobile terminal of claim 35 wherein the power allocation information comprises a power allocation vector containing the power allocation per antenna for the selected transmit antennas.

37. The mobile terminal of claim 32 wherein the antenna configuration information comprises the number of transmit streams and a corresponding weight vector for each transmit stream.

38. The mobile terminal of claim 37 further comprises receiving power allocation information from said transmitting station.

39. The mobile terminal of claim 38 wherein the power allocation information comprises a power allocation vector containing the power allocation per transmit stream.

40. A method of transmitting packet data from base station to a plurality of mobile terminals over a shared packet data channel, said method comprising:
   receiving channel quality estimates from said plurality of mobile terminals;
   scheduling one or more active mobile terminals to receive packet data on said shared packet data channel based on said channel quality estimates from said plurality of mobile terminals;
   selecting a transmitter configuration for transmitting packet data to the active mobile terminals;
   transmitting transmitter configuration information for the selected transmitter configuration to one or more inactive mobile terminals; and
   transmitting packet data to the active mobile terminals using the selected transmitter configuration.

41. The method of claim 40 wherein the transmitter configuration information comprises antenna configuration information.

42. The method of claim 40 wherein the transmitter configuration information comprises power allocation information.

43. The method of claim 42 wherein the power allocation information comprises a relative power allocation for a first downlink channel relative to a second downlink channel.

44. The method of claim 40 wherein the transmitter configuration information comprises code allocation information.

45. The method of claim 40 wherein the transmitter configuration information is transmitted to a broadcast group comprising selected mobile terminals over a broadcast control channel.

46. The method of claim 45 wherein the broadcast group is identified by a group identifier transmitted on the broadcast control channel.

47. The method of claim 45 wherein the broadcast group is dynamically changed via upper layer signaling.

* * * * *